US008606452B2

(12) United States Patent
Kawasaki et al.

(10) Patent No.: US 8,606,452 B2
(45) Date of Patent: Dec. 10, 2013

(54) CONTROL SYSTEM FOR HYBRID CONSTRUCTION MACHINE

(75) Inventors: Haruhiko Kawasaki, Atsugi (JP); Masahiro Egawa, Kawaguchi (JP)

(73) Assignee: Kayaba Industry Co., Ltd., Tokyo (JP)

( * ) Notice: Subject to any disclaimer, the term of this patent is extended or adjusted under 35 U.S.C. 154(b) by 0 days.

(21) Appl. No.: 13/512,865

(22) PCT Filed: Feb. 1, 2011

(86) PCT No.: PCT/JP2011/052062
§ 371 (c)(1), (2), (4) Date: May 30, 2012

(87) PCT Pub. No.: WO2011/099401
PCT Pub. Date: Aug. 18, 2011

(65) Prior Publication Data

US 2012/0245806 A1 Sep. 27, 2012

(30) Foreign Application Priority Data

Feb. 12, 2010 (JP) .................................. 2010-29344

(51) Int. Cl.
*B60W 20/00* (2006.01)

(52) U.S. Cl.
USPC ................................ 701/22; 903/903; 701/50

(58) Field of Classification Search
None
See application file for complete search history.

(56) References Cited

U.S. PATENT DOCUMENTS

| | | | |
|---|---|---|---|
| 6,634,447 B1 | 10/2003 | Matsubara et al. | |
| 2002/0041167 A1 | 4/2002 | Kitano et al. | |
| 2007/0214782 A1* | 9/2007 | Komiyama et al. | 60/431 |
| 2009/0114463 A1* | 5/2009 | DeVault | 180/65.29 |

FOREIGN PATENT DOCUMENTS

| | | | |
|---|---|---|---|
| JP | 2001-086602 | A | 3/2001 |
| JP | 2002-046508 | A | 2/2002 |
| JP | 2009-035192 | A | 2/2009 |
| JP | 2009-287344 | A | 12/2009 |
| JP | 2009287745 | A | 12/2009 |

OTHER PUBLICATIONS

English machine translation of Japanese Patent Office document 2009-287344 A, publication date Dec. 10, 2009.*
English machine translation of Japanese Patent Office document 2009-287745-A, publication date Dec. 10, 2009.*

* cited by examiner

*Primary Examiner* — Helal A Algahaim
*Assistant Examiner* — Rebecca Wagner
(74) *Attorney, Agent, or Firm* — Rabin & Berdo, P.C.

(57) ABSTRACT

A controller determines whether or not the storage amount of a battery is below a threshold, and reduces an assist output of a sub-pump by controlling an assist control mechanism based on an assist correction coefficient, increases the discharge amount of a main pump by controlling an engine controller based on an engine rotation speed correction coefficient and increasing the rotation speed of an engine, and increases an output of the main pump by increasing the rotation speed of the engine by as much as a reduction in the assist output of the sub-pump.

3 Claims, 3 Drawing Sheets

CONTROL SYSTEM FOR HYBRID CONSTRUCTION MACHINE

TECHNICAL FIELD

This invention relates to a control system for hybrid construction machine including an electric motor which is rotated by power of a battery and utilizing power of the electric motor.

BACKGROUND ART

JP2009-287344A discloses a control system for hybrid construction machine including an electric motor which is rotated by power of a battery.

In this conventional system, a sub-pump is rotated by power of the electric motor which is rotated by the battery power and oil discharged from the sub-pump is introduced into a main pump to display an assist force.

When the storage amount of the battery decreases, the charging of the battery is prioritized by reducing the assist force of the sub-pump and increasing the rotation speed of the engine.

SUMMARY OF INVENTION

In the above conventional system, the charging of the battery is prioritized by reducing the assist force of the sub-pump and increasing the rotation speed of the engine when the storage amount of the battery is reduced. However, the system is not so constructed as to compensate for a reduction in an assist output of the sub-pump.

If the reduction in the assist force is not compensated for when the assist force of the sub-pump is reduced, operability changes in an ongoing operation, thereby giving a sense of incongruity to an operator.

This invention aims to provide a control system for hybrid construction machine, the operability of which is stable even if an output of a sub-pump is reduced and which can prevent over discharge.

One aspect of the present invention is directed to a control system for hybrid construction machine, including a variable-capacity main pump; an engine which drives the main pump; an engine rotation speed controller which controls the rotation of the engine; a generator; a battery which stores power generated by the generator; a variable-capacity sub-pump connected to a discharge side of the main pump and adapted to assist the main pump; an assist control mechanism which executes such a control that the sub-pump outputs a commanded assist output; a storage which stores a coefficient table for an assist correction coefficient used to reduce an assist output of the sub-pump by controlling the assist control mechanism when the storage amount of the battery is below a threshold, a coefficient table for an engine rotation speed correction coefficient used to increase the rotation speed of the engine when the storage amount of the battery is below the threshold, and the threshold for the storage amount of the battery; and a controller which determines whether or not the storage amount of the battery is below the threshold, and when the storage amount of the battery is below the threshold, reduces the assist output of the sub-pump by controlling the assist control mechanism based on the assist correction coefficient, increases the discharge amount of the main pump by controlling the engine rotation speed controller based on the engine rotation speed correction coefficient and increasing the rotation speed of the engine, and increases an output of the main pump by increasing the rotation speed of the engine by as much as a reduction in the assist output of the sub-pump.

According to the above aspect, since the output of the main pump is increased by increasing the rotation speed of the engine by as much as a reduction in the assist output of the sub-pump, operability is not deteriorated even if the output of the sub-pump is made relatively small.

Further, since the correction coefficients are stored in a table format in correspondence with the storage amount of the battery, the control of the assist output of the sub-pump and the engine rotation speed is simple and adjustment and maintenance is simple.

An embodiment of the present invention and advantages thereof are described in detail below with reference to the accompanying drawings.

EMBODIMENT OF INVENTION

Figure 1:
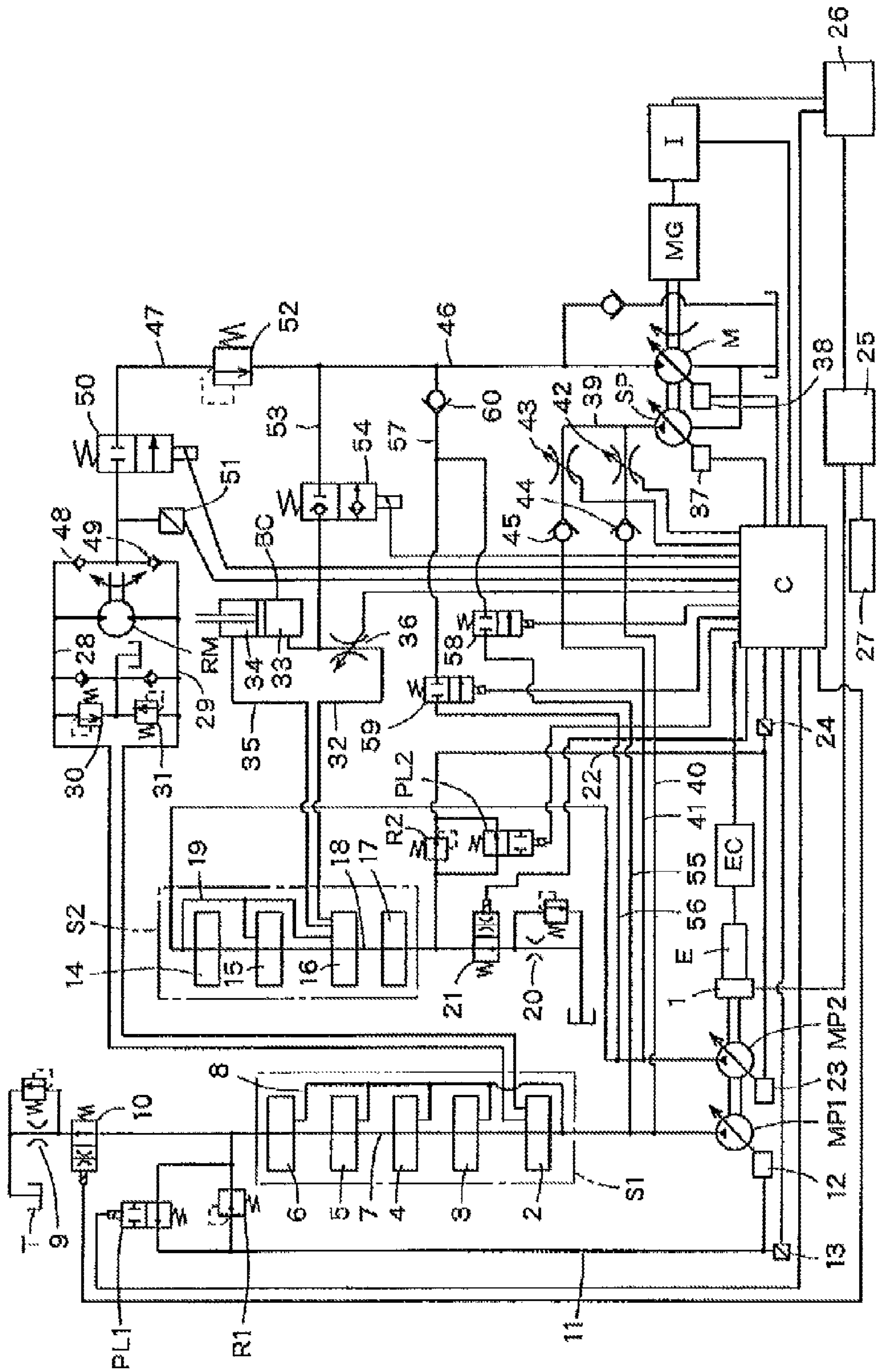
FIG. 1 is a hydraulic circuit diagram of an embodiment of the present invention.

FIG. 1 is a hydraulic circuit diagram of a power shovel. The power shovel includes first and second main pumps MP1, MP2 which have a variable capacity and are driven by an engine E including a rotation speed sensor. The first and second main pumps MP1, MP2 are coaxially rotated. A generator 1 is provided in the engine E and generates power utilizing remaining power of the engine E. The rotation speed of the engine E is controlled by an output signal of an engine controller EC.

The first main pump MP1 is connected to a first circuit system 51. To the first circuit system 51 are connected a control valve 2 for controlling a rotation motor RM, a control valve 3 for controlling an arm cylinder, a control valve 4 for boom second speed for controlling a boom cylinder BC, a control valve 5 for controlling an auxiliary attachment and a control valve 6 for controlling a first travel motor for left travel in this order from an upstream side.

The respective control valves 2 to 6 are connected to the first main pump MP1 via a neutral flow path 7 and a parallel passage 8.

A throttle 9 for generating a pilot pressure is provided downstream of the control valve 6 for the first travel motor in the neutral flow path 7. The throttle 9 generates a high pilot pressure at an upstream side if a flow rate through the throttle is high while generating a low pilot pressure if the flow rate is low.

The neutral flow path 7 introduces all or part of oil discharged from the first main pump MP1 to a tank T via the throttle 9 when all the control valves 2 to 6 are at or near neutral positions. In this case, a high pilot pressure is generated since the flow rate through the throttle 9 is high.

If the control valves 2 to 6 are switched in a full-stroke state, the neutral flow path 7 is closed and a fluid does not flow any longer. Accordingly, in this case, the flow rate through the throttle 9 is almost zero and the pilot pressure is kept at zero.

However, depending on the operating amounts of the control valves 2 to 6, part of the pump-discharged oil is introduced to an actuator and part thereof is introduced to the tank from the neutral flow path 7. Thus, the throttle 9 generates a pilot pressure corresponding to the flow rate in the neutral flow path 7. In other words, the throttle 9 generates the pilot pressure corresponding to the operating amounts of the control valves 2 to 6.

An electromagnetic switching control valve 10 is provided between the control valve 6 at the most downstream side of the neutral flow path 7 and the throttle 9. A solenoid of the electromagnetic switching control valve 10 is connected to a controller C.

The electromagnetic switching control valve 10 is kept at a shown fully open position by the action of a force of a spring when the solenoid is not energized and is switched to a throttle position against the force of the spring when the solenoid is energized. A throttle opening when the electromagnetic switching control valve 10 is switched to the throttle position is smaller than the opening of the throttle 9.

A pilot flow path 11 is connected between the control valve 6 in the neutral flow path 7 and the electromagnetic switching control valve 10. The pilot flow path 11 is connected to a regulator 12 for controlling a tilting angle of the first main pump MP1.

The regulator 12 controls the tilting angle of the first main pump MP1 in inverse proportion to a pilot pressure in the pilot flow path 11 to control a displacing amount per rotation. Accordingly, there is no more flow in the neutral flow path 7 and the pilot pressure is zeroed by setting the control valves 2 to 6 in the full-stroke states, and the tilting angle of the first main pump MP1 is maximized to maximize the displacing amount per rotation.

A pressure reducing valve R1 and a pilot flow path switching electromagnetic valve PL1 are provided in parallel in the pilot flow path 11. That is, the pilot flow path switching electromagnetic valve PL1 is provided in a bypass flow path bypassing the pressure reducing valve R1. The pilot flow path switching electromagnetic valve PL1 is kept at an open position and causes the pressure reducing valve R1 to be bypassed on the way from the neutral flow path 7 to the pilot flow path 11 when a solenoid is not energized. The pilot flow path switching electromagnetic valve PL1 is kept at a closed position and causes the neutral flow path 7 and the pilot flow path 11 to communicate only via the pressure reducing valve R1 when the solenoid is energized.

If the neutral flow path 7 and the pilot flow path 11 communicate while bypassing the pressure reducing valve R1 when all the control valves 2 to 6 are at the neutral positions and the electromagnetic switching control valve 10 is at the fully open position, a pressure upstream of the throttle 9 directly acts as a pilot pressure on the regulator 12. If the pressure upstream of the throttle 9 directly acts on the regulator 12 when all the control valves 2 to 6 are at the neutral positions, the first main pump MP1 ensures a standby flow rate by being kept at a minimum tilting angle.

If the pilot flow path switching electromagnetic valve PL1 is switched to the closed position and the neutral flow path 7 and the pilot flow path 11 communicate via the pressure reducing valve R1, the pilot pressure introduced to the regulator 12 is a pressure reduced by the pressure reducing valve R1. In other words, the pilot pressure acting on the regulator 12 is lower by a reduced amount by the pressure reducing valve R1 than when the pilot flow path switching electromagnetic valve PL1 is at the open position.

Accordingly, the tilting angle of the first main pump MP1 is larger than when all the control valves 2 to 6 are at the neutral positions and the pilot flow path switching electromagnetic valve PL1 is at the open position, whereby the displacing amount per rotation of the first main pump MP1 becomes relatively larger.

A first pressure sensor 13 is connected to the pilot flow path 11. A pressure signal detected by the first pressure sensor 13 is transmitted to the controller C. Since the pilot pressure in the pilot flow path 11 changes according to the operating amounts of the control valves 2 to 6, the pressure signal detected by the first pressure sensor 13 changes according to a required flow rate of the first circuit system S1.

The controller C detects whether or not all the control valves 2 to 6 are at the neutral positions in accordance with the pressure signal detected by the first pressure sensor 13. That is, the controller C stores a pressure, which is generated at the upstream side of the throttle 9 when all the control valves 2 to 6 are at the neutral positions, as a set pressure beforehand. Accordingly, when the pressure signal of the first pressure sensor 13 reaches the set pressure, the controller C can judge that all the control valves are at the neutral positions and the actuators connected thereto are in an inoperative state.

More specifically, operating states of the control valves 2 to 6 are detected by the first pressure sensor 13 that detects the set pressure.

However, a method for detecting the operating states of the control valves 2 to 6 is not limited to the one using the pressure sensor. For example, if sensors for detecting the neutral position are provided for the respective control valves 2 to 6 and connected to the controller C, the operating states of the control valves 2 to 6 can be detected by the sensors for detecting the neutral position.

The second main pump MP2 is connected to a second circuit system S2. To the second circuit system S2 are connected a control valve 14 for controlling a second travel motor for right travel, a control valve 15 for controlling a bucket cylinder, a control valve 16 for controlling the boom cylinder BC, and a control valve 17 for arm second speed for controlling the arm cylinder in this order from an upstream side. A sensor for detecting an operating direction and an operating amount of the control valve 16 is provided in the control valve 16 and transmits an operation signal to the controller C.

The respective control valves 14 to 17 are connected to the second main pump MP2 via a neutral flow path 18. The control valves 15 and 16 are connected to the second main pump MP2 via a parallel passage 19.

A throttle 20 is provided downstream of the control valve 17 in the neutral flow path 18. The throttle 20 functions in just the same manner as the throttle 9 of the first circuit system S1.

An electromagnetic switching control valve 21 is provided between the control valve 17 at the most downstream side in the neutral flow path 18 and the throttle 20. The electromagnetic switching control valve 21 is also identically constructed to the electromagnetic switching control valve 10 of the first circuit system S1.

A pilot flow path 22 is connected between the control valve 17 in the neutral flow path 18 and the electromagnetic switching control valve 21. The pilot flow path 22 is connected to a regulator 23 for controlling a tilting angle of the second main pump MP2.

A pressure reducing valve R2 and a pilot flow path switching electromagnetic valve PL2 are provided in parallel in the pilot flow path 22. That is, the pilot flow path switching electromagnetic valve PL2 is provided in a bypass flow path bypassing the pressure reducing valve R2.

The regulator 23, the pressure reducing valve R2 and the pilot flow path switching electromagnetic valve PL2 are also identically constructed to the regulator 12, the pressure reducing valve R1 and the pilot flow path switching electromagnetic valve PL1 of the first circuit system S1 and operate in the same manners. Accordingly, the description of the operations of the electromagnetic switching control valve 21, the regulator 23, the pressure reducing valve R2 and the pilot flow path switching electromagnetic valve PL2 in the second circuit system S2 are incorporated in the description of the electromagnetic switching control valve 10, the regulator 12, the pressure reducing valve R1 and the pilot flow path switching electromagnetic valve PL1 of the first circuit system S1.

Electromagnetic valves 58, 59 are respectively connected to the first and second main pumps MP1, MP2 via flow paths 55, 56. The flow paths 55, 56 are connected to the first and second main pumps MP1, MP2 at upstream sides of the first and second circuit systems S1, S2.

The electromagnetic valves 58, 59 are kept at shown closed positions when solenoids are not energized and kept at open positions when the solenoids are energized. These solenoids are connected to the controller C.

The electromagnetic valves 58, 59 are connected to a hydraulic motor M via a joint passage 57 and a check valve 60. The hydraulic motor M rotates in association with an electric motor MG which doubles as a generator. Power generated by the rotation of the electric motor MG doubling as the generator charges a battery 26 via an inverter I.

The hydraulic motor M and the electric motor MG doubling as the generator may be connected directly or via a speed reducer.

In the above embodiment, when any one of the control valves of the first and second circuit systems S1, S2, e.g. any one of the control valves of the first circuit system S1 is switched to actuate the actuator connected to this control valve, the flow rate in the neutral flow path 7 changes according to the operating amount of the control valve. The pilot pressure generated at the upstream side of the throttle 9 for generating the pilot pressure changes according to the flow rate in the neutral flow path 7. The regulator 12 controls the tilting angle of the first main pump MP1 according to the pilot pressure. That is, as the pilot pressure decreases, the tilting angle is increased to increase the displacing amount per rotation of the first main pump MP1. On the contrary, as the pilot pressure increases, the tilting angle is reduced to reduce the displacing amount per rotation of the first main pump MP1.

The above action is the same as in a relationship between the second main pump MP2 and the second circuit system S2.

Next, a case is described where an operator inputs a standby regeneration command signal to the controller C through a manual operation to rotate the hydraulic motor M and charge the battery 26.

In a state where the standby regeneration command signal is not input from the operator, the controller C keeps all of the electromagnetic switching control valves 10, 21, the pilot flow path switching electromagnetic valves PL1, PL2 and the electromagnetic valves 58, 59 at shown normal positions. Thus, in this state, the tilting angles of the first and second main pumps MP1, MP2 are controlled by pressures upstream of the throttles 9, 20 for generating the pilot pressure.

Accordingly, if, for example, all the control valves 2 to 6, 14 to 17 are kept at the neutral positions in the above state, the pilot pressures introduced into the pilot flow paths 11, 22 are maximized. If the pilot pressures are maximized, the regulators 12, 23 minimize the displacing amounts per rotation by reducing the tilting angles of the first and second main pumps MP1, MP2, wherefore the first and second main pumps MP1, MP2 ensure the standby flow rates.

If a standby regeneration command signal is input to the controller C through a manual operation of the operator, the controller C determines whether or not pressure signals detected by the first and second pressure sensors 13, 24 have reached the set pressures. Unless the pressure signals have reached the set pressures, it is determined that the actuator connected to any one of the control valves of the first and second circuit systems S1, S2 is in an operative state and the electromagnetic switching control valves 10, 21, the pilot flow path switching electromagnetic valves PL1, PL2 and the electromagnetic valves 58, 59 are kept at the normal positions.

If the pressure signals detected by the first and second pressure sensors 13, 24 have reached the set pressures, the controller C determines that the actuators connected to all the control valves of the first and second circuit systems S1, S2 are in an inoperative state and energizes the electromagnetic switching control valves 10, 21 and the solenoids of the electromagnetic valves 58, 59. Thus, the electromagnetic switching control valves 10, 21 are switched to the throttle positions and the electromagnetic valves 58, 59 are switched to the open positions.

When the electromagnetic switching control valves 10, 21 and the electromagnetic valves 58, 59 are switched, oil discharged from the first and second main pumps MP1, MP2 is supplied to the hydraulic motor M via the electromagnetic valves 58, 59, wherefore the electric motor MG doubling as the generator is rotated by drive force of the hydraulic motor M to generate power. The power generated by the electric motor MG doubling as the generator charges the battery 26 via the inverter I.

In the case of generating power by rotating the electric motor MG doubling as the generator, the controller C detects the storage amount of the battery 26, stores a correction coefficient based on the storage amount in a table format, and controls the rotation speed of the engine E and a standby regenerative power according to the correction coefficient of a coefficient table.

Figure 2:
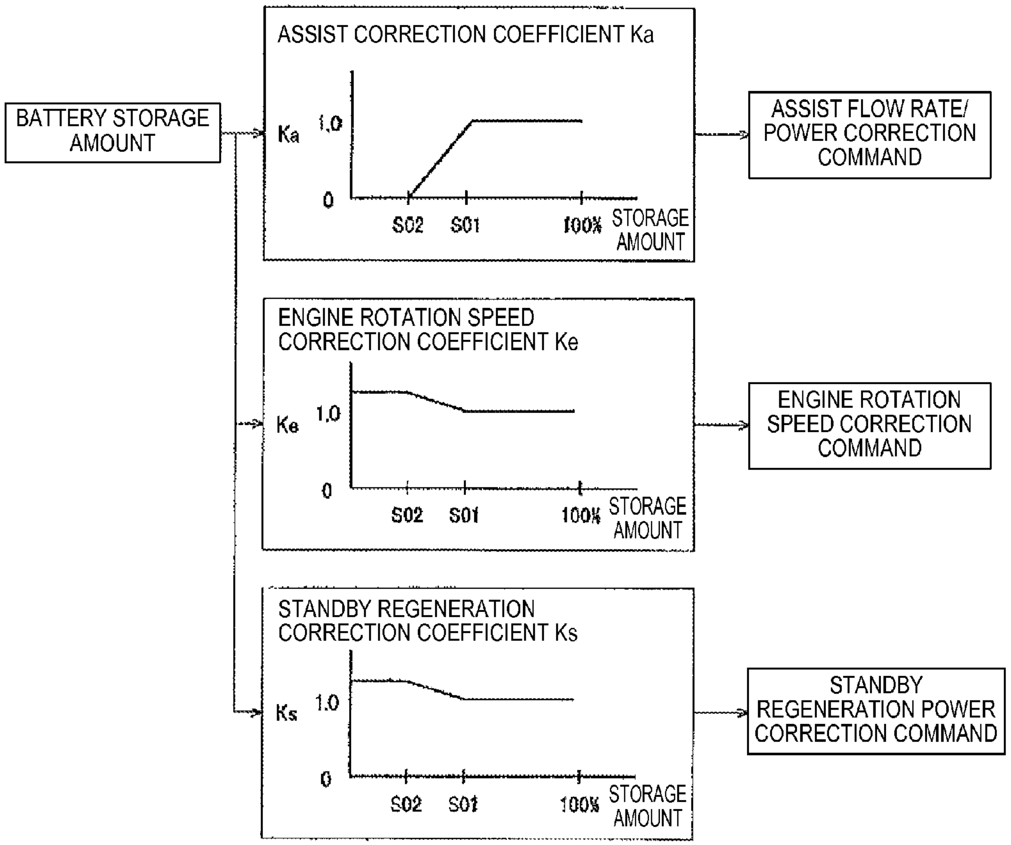
FIG. 2 is a diagram showing correction tables of the embodiment of the present invention.

More specifically, a standby regeneration correction coefficient is stored in a table format in the controller C beforehand as shown in FIG. 2. The standby regeneration correction coefficient is set to be 1 when the storage amount of the battery 26 is above a first threshold SO1, to be larger than 1 when it is below the first threshold SO1 and to be maximized when it is below a second threshold SO2. The controller C controls the engine rotation speed and the standby regenerative power by multiplying a control command value by the above correction coefficient.

Accordingly, if the storage amount of the battery 26 is above the first threshold S01, a standby regeneration correction coefficient KS is 1 and the rotation speed of the engine E and the standby regenerative power are maintained as they are. However, if the storage amount of the battery 26 is below the first threshold SO1, the standby regeneration correction coefficient KS is larger than 1, wherefore the rotation speed of the engine E and the standby regenerative power increase by as much as an increase in the coefficient. If the storage amount is below the second threshold SO2, the standby regeneration correction coefficient is maximized, wherefore the rotation speed of the engine E and the standby regenerative power accordingly further increase.

As the rotation speed of the engine E increases, the rotation speeds of the first and second main pumps MP1, MP2 increase to increase the discharge amounts. If the discharge amounts of the first and second main pumps MP1, MP2 increase, the rotation speed of the hydraulic motor M also increases. Accordingly, the rotation speed of the electric motor MG doubling as the generator also increases to increase the amount of power generation.

That is, if the storage amount of the battery 26 is sufficient, the electric motor MG doubling as the generator keeps the present amount of power generation. If the storage amount falls below the threshold, the amount of power generation of the electric motor MG doubling as the generator increases.

Although the above description is based on the assumption that all the control valves 2 to 6, 14 to 17 of the first and second circuit systems S1, S2 are kept at the neutral positions, the hydraulic motor M can be rotated also when the control valves 2 to 6 of the first circuit system S1 or the control valves 14 to 17 of the second circuit system S2 are at the neutral positions. In this case, the controller C switches either one of the electromagnetic valves 58, 59 to the open position based on the pressure signal from either one of the pressure sensors 13 and 24 and keeps the other of the electromagnetic valves 59, 58 at the closed position. Thus, the discharged oil from either one of the first and second main pumps MP1, MP2 is supplied to the hydraulic motor M and the electric motor MG doubling as the generator can be rotated by a rotational force of the hydraulic motor M.

The generator 1 provided in the engine E is connected to a battery charger 25. Power generated by the generator 1 charges the battery 26 via the battery charger 25.

The battery charger 25 can power-charge the battery 26 also when being connected to a normal power supply 27 for domestic use. That is, the battery charger 25 is also connectable to another independent power supply.

Next, a variable-capacity sub-pump SP which assists outputs of the first and second main pumps MP1, MP2 is described.

The variable-capacity sub-pump SP is rotated by a drive force of the electric motor MG doubling as the generator. The variable-capacity hydraulic motor M is also coaxially rotated by the drive force of the electric motor MG doubling as the generator.

Although described in detail later, the sub-pump SP can be rotated by the drive force of the hydraulic motor M and also by a combined drive force of the electric motor MG doubling as the generator and the hydraulic motor M.

The inverter I connected to the battery 26 is connected to the electric motor MG doubling as the generator. The inverter I is connected to the controller C. The controller C can control the rotation speed of the electric motor MG doubling as the generator and the like.

Titling angles of the sub-pump SP and the hydraulic motor M are controlled by tilting angle controllers 37, 38. The tilting angle controllers 37, 38 are controlled by an output signal of the controller C.

A discharge passage 39 is connected to the sub-pump SP. The discharge passage 39 is branched off to a first assist flow path 40 which joins at a discharge side of the first main pump MP1 and a second assist flow path 41 which joins at a discharge side of the second main pump MP2. First and second proportional electromagnetic throttle valves 42, 43, the openings of which are controlled by an output signal of the controller C, are provided in the respective first and second assist flow paths 40, 41.

Check valves 44, 45 are provided in the first and second assist flow paths 40, 41 and allow the flow only from the sub-pump SP to the first and second main pumps MP1, MP2.

Accordingly, discharged oil from the sub-pump SP is distributed between the first and second assist flow paths 40, 41 according to the openings of the first and second proportional electromagnetic throttle valves 42, 43 and joins the discharged oil from the first and second main pumps MP1, MP2 to assist the first and second main pumps MP1, MP2.

After an assist flow rate of the sub-pump SP is set in correspondence with the pressures detected by the first and second pressure sensors 13, 24, the controller C judges how the tilting angle of the sub-pump SP, that of the hydraulic motor M, the rotation speed of the electric motor MG doubling as the generator and the like are most efficiently controlled and executes the respective controls.

As shown in FIG. 2, the controller C stores an assist correction coefficient used to control the assist flow rate and power according to the storage amount of the battery 26 in a table format. The assist correction coefficient is 1 when the storage amount of the battery 26 is above the first threshold SO1, below 1 when it is below the first threshold SO1 and zero when it is equal to or below the second threshold SO2.

Accordingly, if the storage amount of the battery 26 is above the first threshold SO1, the controller C controls the tilting angle of the sub-pump SP, that of the hydraulic motor M, the rotation speed of the electric motor MG doubling as the generator and the like so that the discharge amount of the sub-pump SP has the assist flow rate and power set beforehand.

If the storage amount of the battery 26 falls below the first threshold SO1, the controller C gives such a correction command that the discharge amount of the sub-pump SP has the assist flow rate and power set beforehand and controls the tilting angle of the sub-pump SP, that of the hydraulic motor M, the rotation speed of the electric motor MG doubling as the generator and the like.

If the storage amount of the battery 26 falls below the second threshold SO2, the controller C controls the tilting angle of the sub-pump SP, that of the hydraulic motor M, the rotation speed of the electric motor MG doubling as the generator and the like so that the discharge amount of the sub-pump SP becomes zero.

The assist output of the sub-pump SP is zeroed when the storage amount falls below the second threshold SO2 in order to prevent over discharge of the battery 26 to drive the sub-pump SP.

The assist flow rate and power of the sub-pump SP are reduced when the storage amount of the battery 26 is reduced as described above in order to prioritize the charging of the battery 26 by reducing the output of the electric motor MG doubling as the generator and reducing the amount of power consumption of the battery 26.

To control the assist flow rate and power of the sub-pump SP as described above, any one of the tilting angle of the sub-pump SP, that of the hydraulic motor M and the rotation speed of the electric motor MG doubling as the generator may be controlled or they may be controlled in a composite manner. Thus, each of the tilting angle controller 37 for controlling the tilting angle of the sub-pump SP, the tilting angle controller 38 for controlling the tilting angle of the hydraulic motor M and the inverter I for controlling the rotation speed of the electric motor MG doubling as the generator constitute an assist control mechanism of this invention.

In the case of reducing the assist flow rate and power of the sub-pump SP as described above, the flow rate equivalent to a reduction in the assist flow rate is compensated for by an increase in the discharge amount of the first and second main pumps MP1, MP2 by increasing the rotation speed of the engine E via the engine controller EC.

Thus, as shown in FIG. 2, the controller C stores an engine rotation speed correction coefficient for controlling the rotation speed of the engine E according to the storage amount of the battery 26 in a table format beforehand. The engine rotation speed correction coefficient is 1 when the storage amount of the battery 26 is above the first threshold SO1, larger than 1 when it is below the first threshold SO1 and maximized when it is equal to or below the second threshold SO2.

The assist correction coefficient Ka and the engine rotation speed correction coefficient Ke are set to be correlated with each other using the storage amount of the battery 26 as a variable and increase the discharge amount of the first and second main pumps MP1, MP2 by as much as a reduction in the assist flow rate of the sub-pump SP so that the amount of oil supplied to the actuator does not vary.

Accordingly, even if the assist flow rate of the sub-pump SP decreases, operability does not change in an ongoing operation and no sense of incongruity is given to the operator.

Thus, in this embodiment, the controller C constantly detects the storage amount of the battery 26 and executes a control corresponding to the storage amount.

Figure 3:
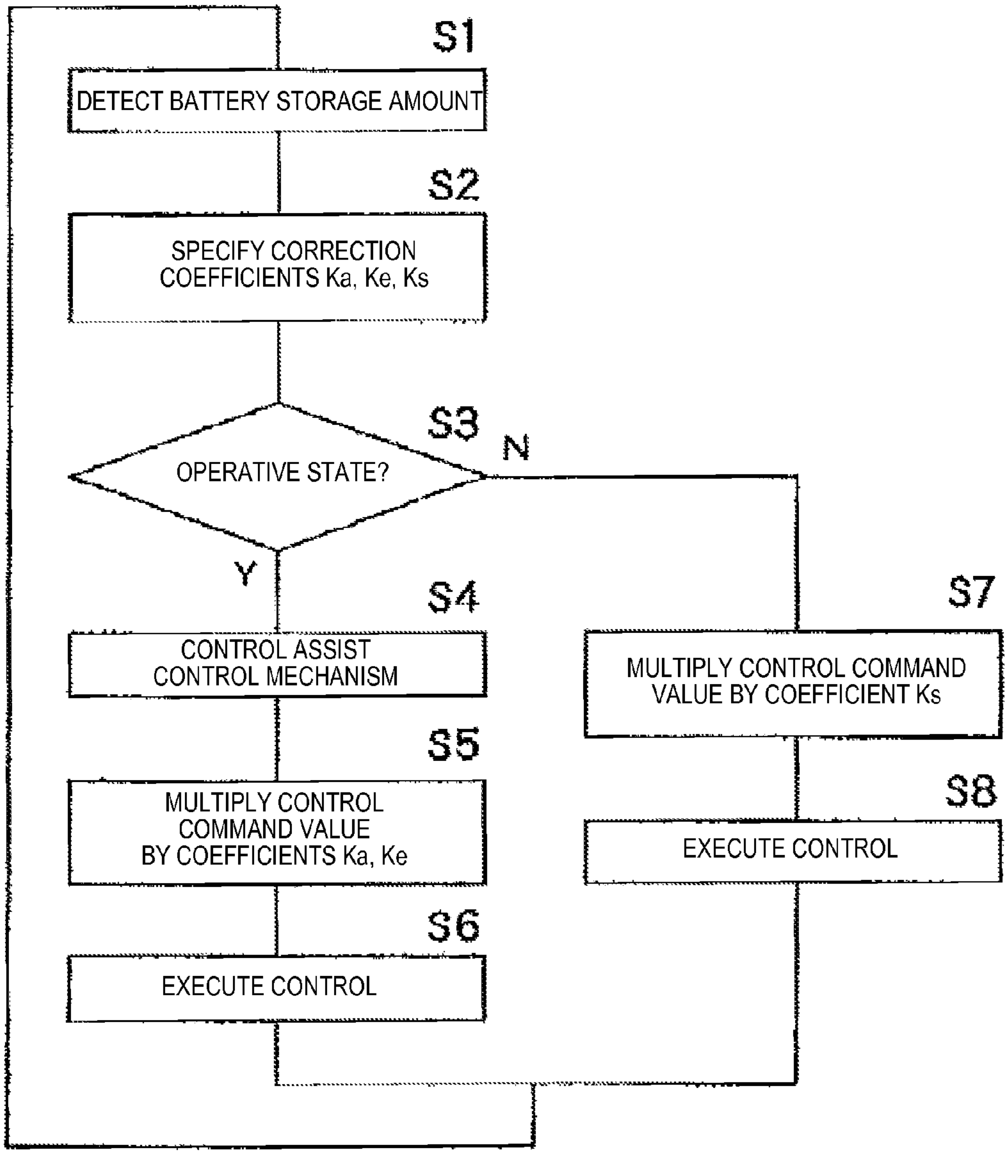
FIG. 3 is a control flow chart of the embodiment of the present invention.

More specifically, as shown in FIG. 3, the controller C detects the storage amount of the battery 26 (Step S1) and specifies the assist correction coefficient Ka, the engine rotation speed correction coefficient Ke and the standby regeneration correction coefficient Ks according to the detected storage amount (Step S2).

After the respective correction coefficients are specified, it is detected whether or not the actuators are in an operative state or in an inoperative state (Step S3). If any actuator is in the operative state, the assist control mechanism is so controlled that the discharge amount of the sub-pump SP becomes an assist flow rate corresponding to the pressures of the pressure sensors 13, 24 (Step S4). The controller C multiplies a normal command value for the sub-pump SP by a coefficient based on the storage amount of the battery 26 (Step S5) and controls the output of the sub-pump SP and the rotation speed of the engine E using a value obtained by multiplication of the coefficient (Step S6).

When the actuators are in the inoperative state in Step S3, this process proceeds to Step S7 to execute a collection control of standby regeneration energy. In this case, the controller C controls the engine rotation speed and the standby regenerative power (Step S8) by multiplying a command value by a coefficient based on the storage amount of the battery 26 (Step S7).

A connection passage 46 is connected to the hydraulic motor M. The connection passage 46 is connected to passages 28, 29 connected to the rotation motor RM via an introducing passage 47 and check valves 48, 49. An electromagnetic switch valve 50 controlled to be opened and closed by the controller C is provided in the introducing passage 47. A pressure sensor 51 for detecting a pressure at the time of rotating the rotation motor RM or at the time of braking is provided between the electromagnetic switch valve 50 and the check valves 48, 49. A pressure signal of the pressure sensor 51 is input to the controller C.

In the introducing passage 47, a safety valve 52 is provided at a position downstream of the electromagnetic switch valve 50 with respect to a flow from the rotation motor RM to the connection passage 46. The safety valve 52 prevents the runaway of the rotation motor RM by maintaining the pressures in the passages 28, 29 in the case of a trouble in a system of the passage 46 such as the electromagnetic switch valve 50.

An introducing passage 53 communicating with the connection passage 46 is provided between the boom cylinder BC and a proportional electromagnetic valve 36. An electromagnetic on-off valve 54 controlled by the controller C is provided in the introducing passage 53.

The passages 28, 29 communicating with the rotation motor RM are connected with an actuator port of the control valve 2 for the rotation motor connected to the first circuit system 51. Brake valves 30, 31 are connected to the respective passages 28, 29. When the control valve 2 for the rotation motor is kept at the neutral position, the actuator port is closed to maintain a stopped state of the rotation motor RM.

When the control valve 2 for the rotation motor is switched in either direction in the above state, one passage 28 is connected to the first main pump MP1 and the other passage 29 communicates with the tank. Thus, pressure oil is supplied from the passage 28 to rotate the rotation motor RM and return oil from the rotation motor RM is returned to the tank via the passage 29.

When the control valve 2 for the rotation motor is switched in a direction opposite to the above, pump-discharged oil is supplied to the passage 29, the passage 28 communicates with the tank and the rotation motor RM is rotated in a reverse direction this time.

In the case of driving the rotation motor RM as described above, the brake valve 30 or 31 displays the function of a relief valve. When pressures in the passages 28, 29 reach the set pressure or more, the brake valves 30, 31 are opened to keep the pressures in the passages 28, 29 at the set pressure. If the control valve 2 for the rotation motor is returned to the neutral position in a rotating state of the rotation motor RM, the actuator port of the control valve 2 is closed. Even if the actuator port of the control valve 2 is closed, the rotation motor RM continues to rotate by inertial energy. The rotation motor RM acts as a pump by being rotated by the inertial energy. In this case, a closed circuit is formed by the passages 28, 29, the rotation motor RM and the brake valve 30 or 31, and the inertial energy is converted into thermal energy by the brake valve 30 or 31.

Unless the pressure in the passage 28 or 29 is kept at a pressure necessary for the rotation or braking, it becomes impossible to rotate the rotation motor RM or brake.

Accordingly, in order to keep the pressure in the passage 28 or 29 at a rotation pressure or a braking pressure, the controller C controls a load of the rotation motor RM while controlling the tilting angle of the hydraulic motor M. That is, the controller C controls the tilting angle of the hydraulic motor M so that the pressure detected by the pressure sensor 51 becomes substantially equal to the rotation pressure of the rotation motor RM or the braking pressure.

If the hydraulic motor M obtains a rotational force, this rotational force acts on the electric motor MG that is coaxially rotated and doubles as the generator. The rotational force of the hydraulic motor M acts as an assist force on the electric motor MG doubling as the generator. Thus, power consumption of the electric motor MG doubling as the generator can be reduced by as much as the rotational force of the hydraulic motor M.

The rotational force of the sub-pump SP can also be assisted by the rotational force of the hydraulic motor M. In this case, the hydraulic motor M and the sub-pump SP display a pressure conversion function together.

That is, the pressure flowing into the connection passage 46 is lower than a pump-discharged pressure in many cases. To maintain a high discharge pressure of the sub-pump SP utilizing this low pressure, the hydraulic motor M and the sub-pump SP display a pressure boost function.

More specifically, the output of the hydraulic motor M is determined by a product of a displacing capacity Q1 per rotation and a pressure P1 at that time. The output of the sub-pump SP is determined by a product of a displacing capacity Q2 per rotation and a discharge pressure P2. In this embodiment, $Q1 \times P1 = Q2 \times P2$ has to hold since the hydraulic motor M and the sub-pump SP are coaxially rotated. Accordingly, the above equation becomes $3Q2 \times P1 = Q2 \times P2$, for example, if the displacing capacity Q1 of the hydraulic motor M is set to be three times as much as the displacing capacity Q2 of the sub-pump SP, i.e. $Q1 = 3Q2$. $3P1 = P2$ holds if the both sides of this equation are divided by Q2.

Accordingly, if the displacing capacity Q2 is controlled by changing the tilting angle of the sub-pump SP, the sub-pump SP can be maintained at a predetermined discharge pressure by the output of the hydraulic motor M. In other words, the hydraulic pressure from the rotation motor RM can be discharged from the sub-pump SP by being boosted.

The tilting angle of the hydraulic motor M is so controlled as to keep the pressures in the passages 28, 29 at the rotation pressure or the braking pressure as described above. Thus, in the case of utilizing the hydraulic pressure from the rotation motor RM, the tilting angle of the hydraulic motor M is inevitably determined. To display the pressure conversion function described above after the tilting angle of the hydraulic motor M is determined in this way, the tilting angle of the sub-pump SP is controlled.

If the pressure in the system of the passage 46 becomes lower than the rotation pressure or the braking pressure for a certain reason, the controller C closes the electromagnetic switch valve 50 so as not to affect the rotation motor RM based on a pressure signal from the pressure sensor 51.

If the pressure oil leaks in the connection passage 46, the safety valve 52 functions to prevent the pressures in the passages 28, 29 from being lowered more than necessary, thereby preventing the runaway of the rotation motor RM.

Concerning the boom cylinder BC, pressure oil from the second main pump MP2 is supplied to a piston-side chamber 33 of the boom cylinder BC via a passage 32 if the control valve 16 is switched in one direction from the neutral position. Return oil from a rod-side chamber 34 is returned to the tank via a passage 35 and the boom cylinder BC extends.

If the control valve 16 is switched in a direction opposite to the above, the pressure oil from the second main pump MP2 is supplied to the rod-side chamber 34 of the boom cylinder BC via the passage 35. Return oil from the piston-side chamber 33 is returned to the tank via the passage 32 and the boom cylinder BC contracts. The control valve 3 for boom second speed is switched in association with the control valve 16.

A proportional electromagnetic valve 36, the opening of which is controlled by the controller C, is provided in the passage 32 connecting the piston-side chamber 33 of the boom cylinder BC and the control valve 16. The proportional electromagnetic valve 36 is kept at a fully open position in a normal state.

If the control valve 16 is switched to actuate the boom cylinder BC, an operating direction and an operating amount of the control valve 16 are detected and an operation signal is input to the controller C by a sensor provided in the control valve 16.

In accordance with the operation signal of the sensor, the controller C determines whether the operator is trying to raise or lower the boom cylinder BC. If a signal to raise the boom cylinder BC is input to the controller C, the controller C keeps the proportional electromagnetic valve 36 in the normal state. In other words, the proportional electromagnetic valve 36 is kept at the fully open position. In this case, the controller C keeps the electromagnetic on-off valve 54 at a shown closed position and controls the rotation speed of the electric motor MG doubling as the generator and the tilting angle of the sub-pump SP.

If a signal to lower the boom cylinder BC is input from the sensor to the controller C, the controller C calculates a lowering speed of the boom cylinder BC requested by the operator in accordance with the operating amount of the control valve 16, closes the proportional electromagnetic valve 36 and switches the electromagnetic on-off valve 54 to an open position.

When the proportional electromagnetic valve 36 is closed and the electromagnetic on-off valve 54 is switched to the open position, the total amount of return oil from the boom cylinder BC is supplied to the hydraulic motor M. However, if the flow rate consumed by the hydraulic motor M is less than a flow rate necessary to maintain the lowering speed requested by the operator, the boom cylinder BC cannot maintain the lowering speed requested by the operator. In this case, the controller C controls the opening of the proportional electromagnetic valve 36 to return oil at a flow rate equal to or higher than the flow rate consumed by the hydraulic motor M to the tank based on the operating amount of the control valve 16, the tilting angle of the hydraulic motor M, the rotation speed of the electric motor MG doubling as the generator and the like, thereby maintaining the lowering speed of the boom cylinder BC requested by the operator.

In the case of lowering the boom cylinder BC while rotating the rotation motor RM, the pressure oil from the rotation motor RM and the return oil from the boom cylinder BC join in the connection passage 46 to be supplied to the hydraulic motor M.

If the pressure in the introducing passage 47 increases, the pressure in the introducing passage 47 side also increases. Even if this pressure becomes higher than the rotation pressure of the rotation motor RM or the braking pressure, the rotation motor RM is not affected since the check valves 48, 49 are provided.

If the pressure in the connection passage 46 side becomes lower than the rotation pressure or the braking pressure, the controller C closes the electromagnetic switch valve 50 in accordance with a pressure signal from the pressure sensor 51.

Accordingly, in the case of simultaneously performing the rotating operation of the rotation motor RM and the lowering operation of the boom cylinder BC as described above, the tilting angle of the hydraulic motor M may be determined based on the necessary lowering speed of the boom cylinder BC regardless of the rotation pressure or the braking pressure.

At any rate, the output of the sub-pump SP can be assisted by the output of the hydraulic motor M and the flow discharged from the sub-pump SP can be proportionally distributed by the first and second proportional electromagnetic throttle valve 42, 43 and supplied to the first and second circuit system S1, S2.

In the case of using the electric motor MG doubling as a generator as the generator using the hydraulic motor M as a drive source, the generator G can be made to operate utilizing the output of the hydraulic motor M if the tilting angle of the sub-pump SP is zeroed to set a substantially zero load state and the hydraulic motor M maintains an output necessary to rotate the electric motor MG doubling as the generator.

Power can be generated by the generator 1 utilizing the output of the engine E or by the electric motor MG doubling as the generator utilizing the hydraulic motor M.

Since the check valves 44, 45 are provided and the electromagnetic switch valves 50 and the electromagnetic on-off valve 54 or the electromagnetic valves 58, 59 are provided, a system including the first and second main pumps MP1, MP2 and a system including the sub-pump SP and the hydraulic motor M can be hydraulically separated, for example, when the system including the sub-pump SP and the hydraulic motor M breaks down. Particularly, when the electromagnetic switch valve 50, the electromagnetic on-off valve 54 and the electromagnetic valves 58, 59 are in the normal states, they are kept at the closed positions by the forces of the springs as shown and the proportional electromagnetic valve 36 is also kept at the normal position that is the fully open position.

Thus, even if an electric system breaks down, the system including the first and second main pumps MP1, MP2 and the system including the sub-pump SP and the hydraulic motor M can be hydraulically separated.

The embodiment of the present invention has been described above. The above embodiment is merely illustration of one application example of the present invention and not of the nature to specifically limit the technical scope of the present invention to the above embodiment.

The present application claims a priority based on Japanese Patent Application No. 2010-29344 filed with Japanese Patent Office on Feb. 12, 2010, all the contents of which are hereby incorporated by reference.

INDUSTRIAL APPLICABILITY

This invention is applicable to construction machines such as hybrid power shovels.

The invention claimed is:

1. A control system for a hybrid construction machine, comprising:

a variable-capacity main pump;

an engine that drives the main pump;

an engine rotation speed controller that controls the rotation of the engine;

a generator;

a battery that stores power generated by the generator;

a variable-capacity sub-pump connected to a discharge side of the main pump and adapted to assist the main pump;

an assist control mechanism that controls the sub-pump to output a commanded assist output;

a storage that stores a coefficient table for an assist correction coefficient used to reduce an assist output of the sub-pump by controlling the assist control mechanism when the storage amount of the battery is below a threshold value, a coefficient table for an engine rotation speed correction coefficient used to increase the rotation speed of the engine when the storage amount of the battery is below the threshold value, and the threshold value for the storage amount of the battery; and a controller that determines whether or not the storage amount of the battery is below the threshold value, and when the storage amount of the battery is below the threshold value, reduces the assist output of the sub-pump by controlling the assist control mechanism based on the assist correction coefficient, increases the discharge amount of the main pump by controlling the engine rotation speed controller based on the engine rotation speed correction coefficient and increasing the rotation speed of the engine, and increases an output of the main pump by increasing the rotation speed of the engine by as much as a reduction in the assist output of the sub-pump.

2. The control system according to claim 1, wherein:

the storage stores a first threshold value and a second threshold value smaller than the first threshold value for the storage amount of the battery; and the controller reduces the assist output of the sub-pump based on the assist correction coefficient when the storage amount of the battery is below the first threshold value and zeroes the assist output of the sub-pump based on the assist correction coefficient when the storage amount of the battery is reduced to the second threshold value.

3. The control system according to claim 1, further comprising:

a circuit system that is connected to the main pump and includes a plurality of control valves;

a hydraulic motor connected to the main pump and adapted to rotate the generator; and a neutral flow path in which oil discharged from the main pump flows when all the control valves in the circuit system are maintained at neutral positions;

wherein the discharge amount of the main pump is maintained at a standby flow rate by the action of a pilot pressure generated in the neutral flow path and the hydraulic motor causes generation of a standby regenerative power by the action of the standby flow rate when all the control valves of the circuit system are maintained at the neutral positions;

wherein the storage stores a table of a standby regeneration correction coefficient used to increase the standby regenerative power when the storage amount of the battery is below the threshold value; and wherein the controller increases the rotation speed of the engine and the standby regenerative power by controlling the engine rotation speed controller based on the standby regeneration correction coefficient when the storage amount of the battery is below the threshold value and all the control valves of the circuit system are at the neutral positions.

* * * * *